(12) United States Patent
Yamada

(10) Patent No.: US 8,073,616 B2
(45) Date of Patent: Dec. 6, 2011

(54) CONTROL INFORMATION STORAGE APPARATUS

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 973 days.

(21) Appl. No.: 12/069,137

(22) Filed: Feb. 7, 2008

(65) Prior Publication Data
US 2008/0195310 A1    Aug. 14, 2008

(30) Foreign Application Priority Data
Feb. 14, 2007 (JP) ................... 2007-033988

(51) Int. Cl.
*G01C 21/30* (2006.01)
(52) U.S. Cl. .................................... 701/208
(58) Field of Classification Search ........... 701/200, 701/202, 208
See application file for complete search history.

(56) References Cited

U.S. PATENT DOCUMENTS

| | | | |
|---|---|---|---|
| 6,049,753 A * | 4/2000 | Nimura | 701/201 |
| 6,098,015 A | 8/2000 | Nimura et al. | |
| 2004/0039523 A1 * | 2/2004 | Kainuma et al. | 701/208 |
| 2004/0230376 A1 | 11/2004 | Ichikawa et al. | |
| 2005/0251329 A1 | 11/2005 | Ishikawa et al. | |

FOREIGN PATENT DOCUMENTS

| | | |
|---|---|---|
| JP | 09-287968 | 11/1997 |
| JP | 11-316896 | 11/1999 |
| JP | 2004-282848 | 10/2004 |
| JP | 2005-035533 | 2/2005 |
| JP | 2005-038238 | 2/2005 |
| JP | 2005-121707 | 5/2005 |
| JP | 2005-308584 | 11/2005 |
| JP | 2005-308585 | 11/2005 |
| JP | 2006-003147 | 1/2006 |

* cited by examiner

*Primary Examiner* — Gerald J. O'Connor
*Assistant Examiner* — John Pauls
(74) *Attorney, Agent, or Firm* — Harness, Dickey & Pierce, PLC (57) ABSTRACT

Vehicle control data is stored in a database of a vehicle control information storage apparatus of the present invention by a unit of road segment. When the same vehicle travels the same road segment for plural times, vehicle speed is averaged for storage as the vehicle control information in the database. Further, learning data has a value that is smaller than a threshold for the segment next to a current segment with a fulfillment of other conditions, the data is combined before storage in the database, thereby achieving a smaller storage volume in the database for the same amount of control information.

6 Claims, 11 Drawing Sheets

| | SEG | (1) | (2) | (3) | (4) | (5) | (6) | (7) | (8) | (9) |
|---|---|---|---|---|---|---|---|---|---|---|
| TO | AVG SPD (STR.) | | | | | | | | | |
| | TIME | | | | | | | | | |
| | # OF TR | | | | | | | | | |
| | AVG SPD (R/L TURN) | | | | | | | | | |
| | TIME | | | | | | | | | |
| | # OF TR | | | | | | | | | |
| | AVG SPD (STOP) | | | | | | | | | |
| | TIME | | | | | | | | | |
| | # OF TR | | | | | | | | | |
| FROM | AVG SPD (STR.) | | | | | | | | | |
| | TIME | | | | | | | | | |
| | # OF TR | | | | | | | | | |
| | AVG SPD (R/L TURN) | | | | | | | | | |
| | TIME | | | | | | | | | |
| | # OF TR | | | | | | | | | |
| | AVG SPD (STOP) | | | | | | | | | |
| | TIME | | | | | | | | | |
| | # OF TR | | | | | | | | | |

DATA OPTIMIZATION

| | SEG | (1) | (2) | (3) | (4) | (7) | (8) | (9) |
|---|---|---|---|---|---|---|---|---|
| TO | AVG SPD (STR.) | 10m/s | 20m/s | | 20m/s | 15m/s | 20m/s | |
| | TIME | 2 SEC | 4 SEC | | 1 SEC | 1.4 SEC | 2 SEC | |
| | # OF TR | 3 | 3 | | 1 | 1 | 1 | |
| | AVG SPD (R/L TURN) | | | | 5m/S | | | |
| | TIME | | | | 4 SEC | | | |
| | # OF TR | | | | 1 | | | |
| | AVG SPD (STOP) | | | | 0.5m/s | | | 8m/s |
| | TIME | | | | 40 SEC | | | 4 SEC |
| | # OF TR | | | | 1 | | | 1 |

CONTROL INFORMATION STORAGE APPARATUS

CROSS REFERENCE TO RELATED APPLICATION

The present application is based on and claims the benefit of priority of Japanese Patent Application No. 2007-33988 filed on Feb. 14, 2007, the disclosure of which is incorporated herein by reference.

FIELD OF THE INVENTION

The present disclosure generally relates to a control information storage apparatus for use in a vehicle.

BACKGROUND INFORMATION

Conventionally, a vehicle control is provided by utilizing map data in a navigation apparatus for suitably controlling a vehicle according to a road condition of a currently traveling road. For an accurate control of the vehicle, the map data in the navigation apparatus needs to be precisely prepared. However, the accuracy of the map data in the navigation apparatus is not sufficiently accurate for the requirement of the accurate control.

Therefore, techniques that store a trace of a travel of the vehicle as control information for controlling the vehicle are proposed. That is, for example, Japanese patent document JP-A-2005-121707 discloses an apparatus that is capable of matching a stored road shape in stored road information with a real road shape including a travel lane. The apparatus corrects the road information in a storage according to travel trace information derived from a travel of the vehicle on a road. That is, the apparatus corrects the road information in each of a travel direction of a road based on the travel trace information when the road information represents the road that is travelable bi-directionally as one road shape.

However, the road shape being handled in the above apparatus is a static object, thereby not changing for each travel of the vehicle on the road.

On the other hand, Japanese patent document JP-A-2006-3147 discloses a technique that records travel data of the vehicle such as vehicle speed that dynamically changes for each occasion of the travel. In the disclosure, a travel data output apparatus that can encourage a driver to drive the vehicle safely and in a fuel saving manner is described. The apparatus acquires route data and travel data of a certain route for storing it in a travel history database. Then, the route data of a currently traveled route is searched for in the database as the vehicle travels, for a display of travel data of the currently traveled road on a display unit in terms of fuel consumption, travel time, and average speed.

However, the travel data output apparatus does not mention a case where the same road is traveled for plural times. Therefore, a data storage area size for storing the travel data becomes very large if the travel data is stored separately for each day of travel.

Further, because the travel data is stored by a unit of travel route, the travel data is not handled appropriately even when travel data of plural travel routes has a redundant travel section. That is, the travel data is not examined in terms of same travel routes in the travel data.

SUMMARY OF THE INVENTION

In view of the above and other problems, the present invention provides a technique that reduces an amount of stored control information for a purpose of controlling a vehicle without compromising a usability of the information when the control information is acquired from a travel of the vehicle.

A control information storage apparatus of the present invention thus have a travel position determination unit capable of determining a travel position of a vehicle with regard to a predetermined road section; an information storage unit; and a storage control unit capable of storing control information that is derived from a travel of the vehicle for use in vehicle travel control. The storage control unit stores to the information storage unit the control information in association with the road section that is identified by the travel position determination unit Further, the storage control unit stores the control information derived from plural travel occasions of a same road section as an averaged value of the plural travel occasions, and the storage control unit stores only one entry of the control information for two adjacent road sections by combining two entries of the control information respectively in association with the two adjacent road sections if the two entries of the control information are determined to be substantially identical based on a predetermined criterion of sameness.

In this case, a predetermined road section is, for example, a road unit that connects two intersections (i.e., so-called link), a road unit that connects two road shape definition points (i.e., so-called segment defined by so-called complementary shape point).

The control information storage apparatus stores the control information by averaging the value of the control information derived from two times or greater number of travels of the same road that has pre-memorized control information instead of separately memorizing the control information from respective travel occasions of the same road. The control information is associated with a road section of predetermined unit, thereby leading to a volume reduction of the control information even when the traveled road is partially different from the previously traveled road.

Further, the substantially identical control information respectively from two adjacent road sections is combined as one entry for storage in a database based on a certain criterion of sameness. The criterion may be, for example, a condition that the difference of two control information values is within a threshold, or similar conditions. More practically, when an average vehicle speed is stored as the control information, the two entries of the control information derived from two adjacent road sections can be combined to be one entry in a case that the average vehicle speeds in the two adjacent road sections substantially has the same values. In this manner, the amount of the control information volume is reduced.

Therefore, the control information derived from the travel of the vehicle is stored to the information storage unit in a storage efficient manner without compromising usefulness of the control information.

BRIEF DESCRIPTION OF THE DRAWINGS

Other objects, features and advantages of the present invention will become more apparent from the following detailed description made with reference to the accompanying drawings, in which.

DETAILED DESCRIPTION

The embodiment which present invention was applied to as follows is explained with reference to the drawings. The embodiment of the present invention needs not to be limited to a form described in the following, and may take modifications as long as they pertain to a scope of the present invention.

(Explanation of Configuration)

Figure 1:
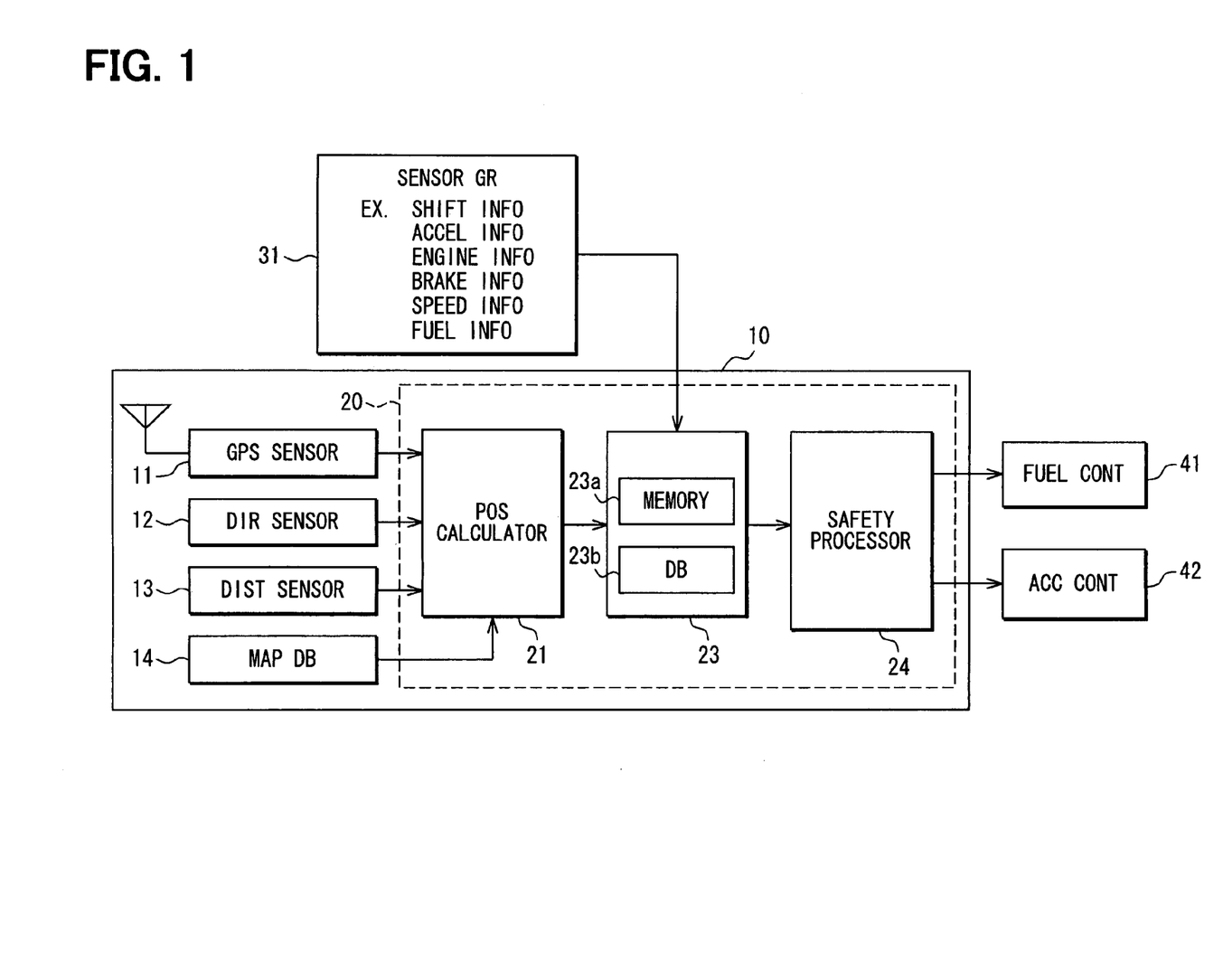
FIG. 1 shows a block diagram showing an outline configuration of a navigation apparatus in an embodiment of the present invention.

FIG. 1 is a block diagram showing a configuration of a navigation apparatus 10 which has functions of a control information storage apparatus of the present invention implemented therein.

The embodiment which the present invention is applied to is explained with drawings. The navigation apparatus 10 is for use in a vehicle that utilizes a hybrid power source of a gasoline engine and a motor, with a GPS sensor 11, a direction sensor 12, a distance sensor 13, a map database 14 and a control unit 20.

The GPS sensor 11 receives an electric wave from a satellite for Global Positioning System (GPS) through a GPS antenna, and the absolute location (latitude, longitude and altitude) of a GPS equipped vehicle (a vehicle hereinafter) which has the navigation apparatus 10 installed therein.

Figure 4:
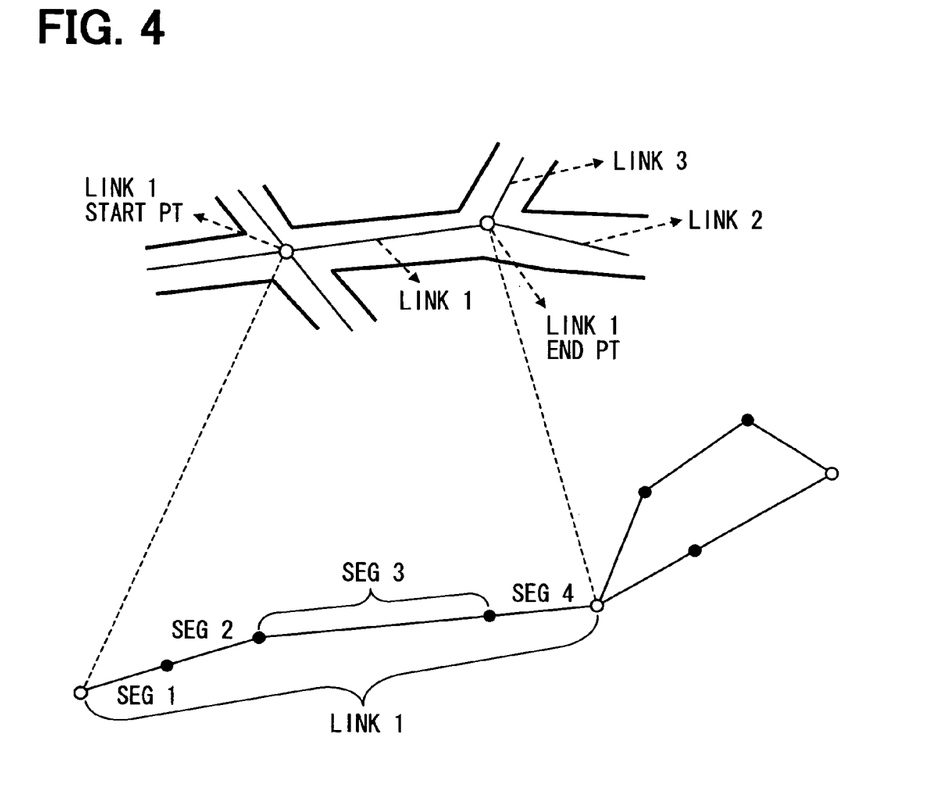
FIG. 4 shows an illustration of links and segments.

The direction sensor 12 detects an absolute direction of the vehicle based on geomagnetism. The distance sensor 13 detects a travel distance of the vehicle. The map database 14 stores map data consisting of various kinds of information about the map. In the map data, the road which is traveled by a vehicle is represented by a node that is set in the middle position of each crossing of the real road and a link that connects two nodes. In other words, the road in the map data is divided to a unit of links as shown in FIG. 4, and each link is connected to other links at a node (a white dot) that defines endpoints of the link. Further, a link ID (a road identifier) that is a peculiar identifier is given to each link, and a link can be identified by the link ID. In this case, "crossing" generally represents a spot that plural roads are connected to, and the "crossing" includes a crossroad, a T-shaped road, a branching point, a junction and the like. That is, a node is defined as a point which three or more links are connected to.

In addition, one link consists of one or more segments. When one link consists of plural segments, there is a supplement shape point (a black spot) between nodes. For example, there are three supplement shape points on a link (1) as shown in FIG. 4, and the link (1) consists of four segments (1)-(4). A link (2) consists of segments (5), (6), and a link (3) consists of segments (7)-(9) likewise (refer to FIG. 4 and FIG. 5).

In addition, the map database 14 may be configured to store map data on a hard disk device, or may retrieve the map data from a portable memory medium such as a magnetic disk, a magneto-optical (MO) disk, a semiconductor memory or the like.

The control unit 20 typically consists of a microcomputer that includes a CPU, ROM, RAM, SRAM, I/O, a bus line that connects these parts and the like, and provides functions of a vehicle position calculation unit 21, a learning unit 23 and a safety control processing unit 24.

The vehicle position calculation unit 21 detects the current position (absolute location) of the vehicle based on signals from each of the GPS sensor 11 and the direction sensor 12 and the distance sensor 13, and performs a current position display process that displays on a display unit (not shown) the current vehicle position represented by a vehicle position mark with a map around the current position by retrieving the map data memorized in the map database 14, a route guidance process that searches and provides the most suitable route from the current position to the destination and other processes.

In addition, to ROM, a program to carry out processing (refer to FIGS. 2, 3) to be mentioned later is memorized. Further, programs that performs processing described later (refer to FIGS. 2, 3) are stored in the ROM.

In addition, the learning unit 23 has a memory 23a as a temporary memory memorizing information input from a vehicle information sensor group 31 and a database 23b as a storage of information that is derived by processing the information temporarily memorized in the memory 23a. The database 23b consists of, for example, the nonvolatile memory medium such as a hard disk, a flash memory or the like for retaining the data even when the power supply is turned off. The learning unit 23 also has a function to write information to the memory 23a/database 23b, a function to carry out predetermined processing for information memorized temporarily in the memory 23a and other functions.

In addition, information input from the vehicle information sensor group 31 is, for example, shift change information, accelerator opening information, engine rotation information, brake signal information, vehicle speed information, fuel injection information and the like.

Furthermore, a safety control processing unit 24 controls plural vehicle control units 41, 42 carried by the vehicle which has the navigation apparatus 10 of the present embodiment. More practically, the vehicle control unit 41 provides fuel mileage improvement control for the motor and the engine to improve the fuel mileage (Fuel control unit), and the vehicle control unit 42 provides an adaptive cruise control (ACC) to adaptively follow a leading vehicle with a suitable inter-vehicle distance by regulating the engine/gear/brake and the like for a subject vehicle with the leading vehicle based on the distance from the leading vehicle and a relative speed relative to the leading vehicle in association with the travel condition of the subject vehicle, or to keep a predetermined vehicle speed for the subject vehicle that has no leading vehicle (ACC control unit).

The navigation apparatus 10 of the present embodiment memorizes control information for use in a vehicle control performed on the road in sections from the departure place to the destination in database 23b (refer to FIG. 1) by a unit of segment. In the following description, "vehicle speed" is explained as an example of the control information.

Figure 5:
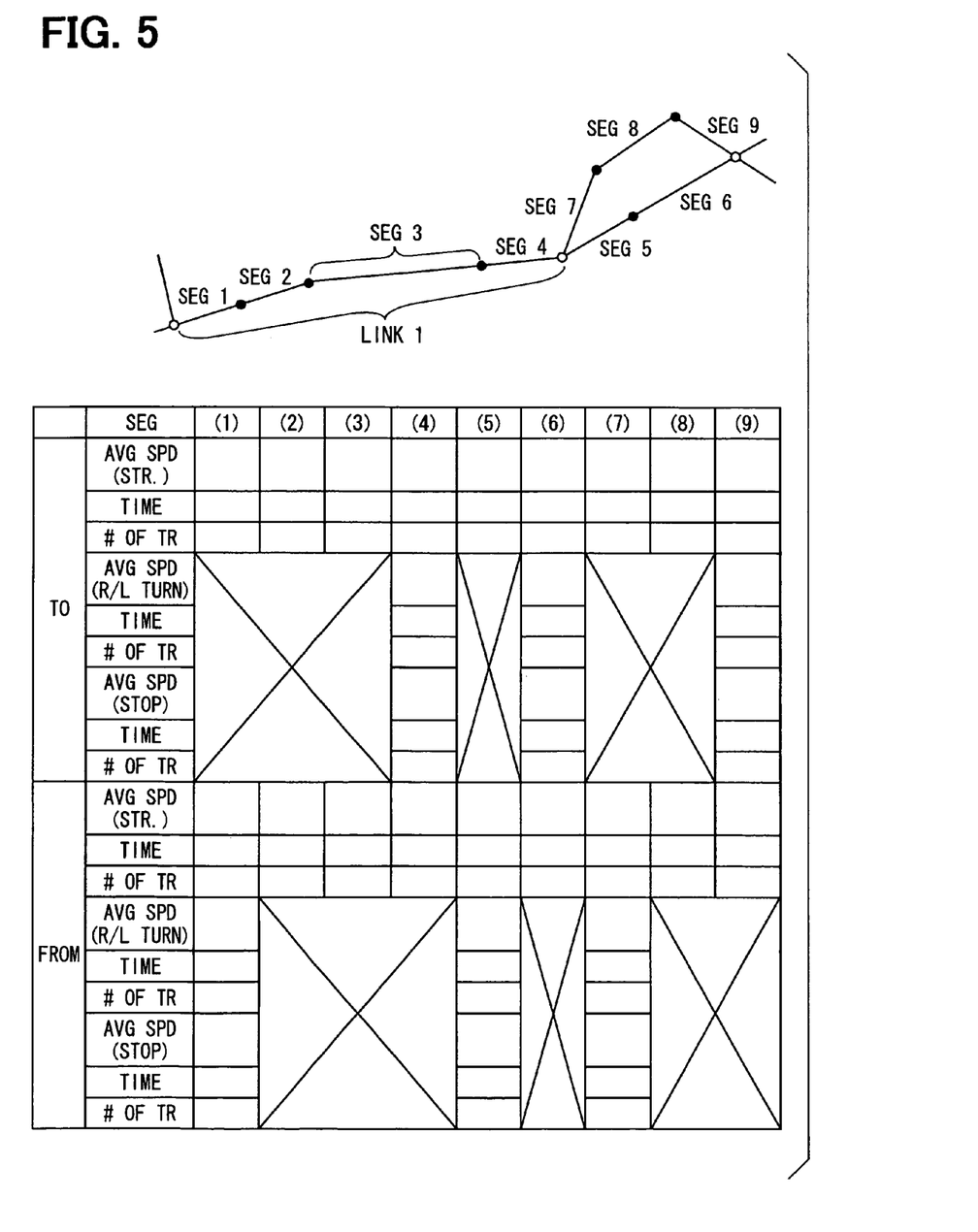
FIG. 5 shows a diagram of a database in a learning unit of the navigation apparatus.

The information is memorized by using a unit of segment respectively for an outward trip ("TO" rows in the diagram) and a return trip ("FROM" rows in the diagram) as shown in FIG. 5 even if the travel is on the same road. The information stores three kinds of average speeds, that is, an average speed of straight travel, an average speed of right/left turn, and an average speed of stopping. These average speeds are stored respectively in association with an elapsed time and the number of travel times.

In addition, as shown in FIG. 5, the information is memorized about all three kinds of average speeds (i.e., the average speeds of straight travel/turning/stopping) for the segment entering to a crossing. The information for other segments memorizes only the average speed of the straight travel. That is, in other words, in the outward trip, the information is memorized about all three kinds of average speeds (i.e., the average speeds of straight travel/turning/stopping) for the segments (4), (6), (9) in FIG. 5, and the information for other segments, that is, for the segments (1), (2), (3), (5), (7), (8) memorizes one kind of average speed, that is, only the average speed of the straight travel. In addition, in the return trip, the information is memorized about all three kinds of average speeds (i.e., the average speeds of straight travel/turning/stopping) for the segments (1), (5), (7), and the information for other segments, that is, for the segments (2), (3), (4), (6), (8), (9) memorizes one kind of average speed, that is, only the average speed of the straight travel.

The control information described above is memorized in the database 23b, and the control information is output to the fuel mileage control unit 41 and to the ACC control unit 42 from the safety control processing unit 24 when the vehicle travels the road which already has memorized control information. Therefore, the control units 41, 42 are capable of providing an accurate vehicle control based on the control information. The details of the accurate control are described later.

(Explanation of Processing)

Figure 6:
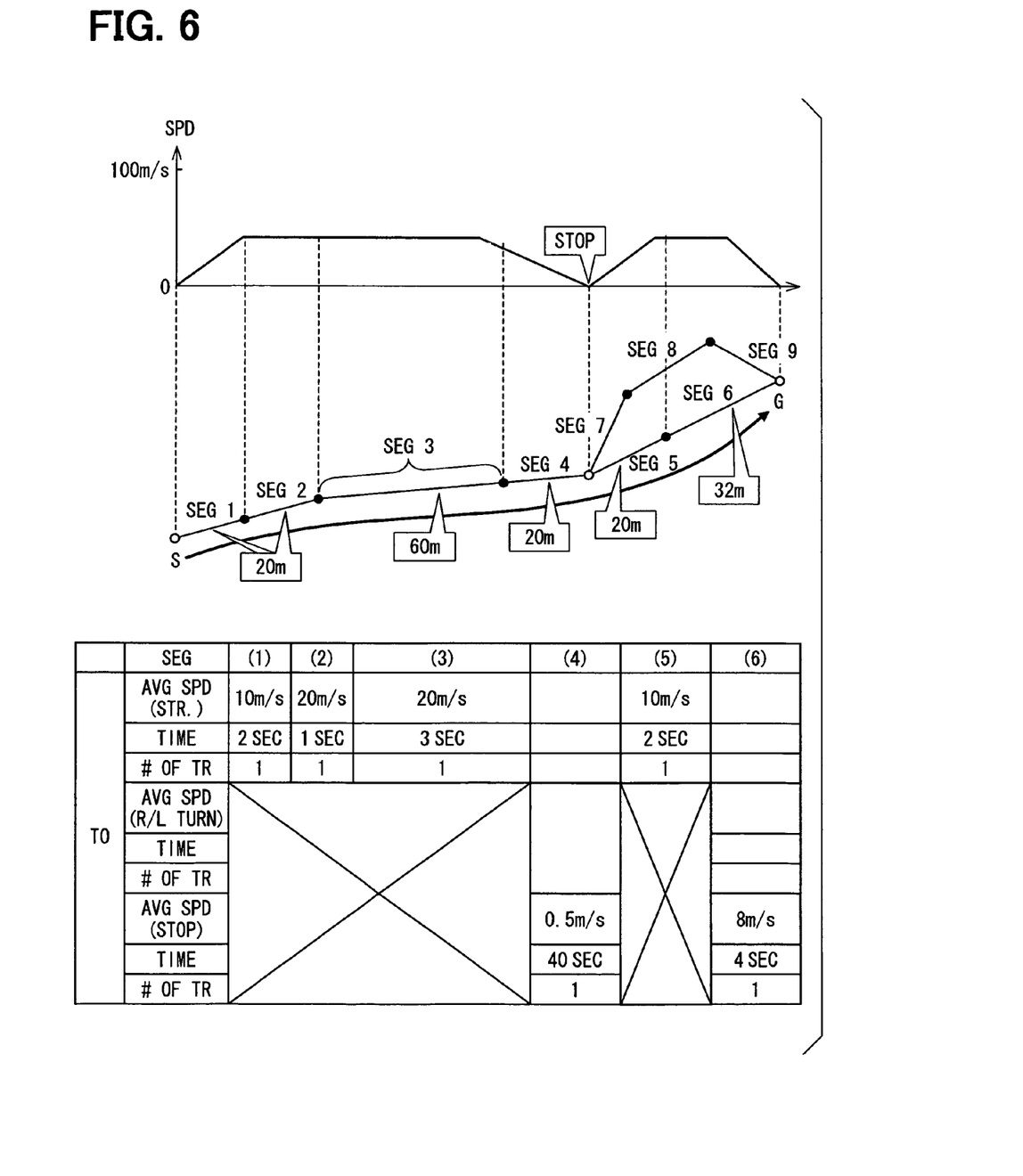
FIG. 6 shows an illustration of data storage to the database in the learning unit.
Figure 7:
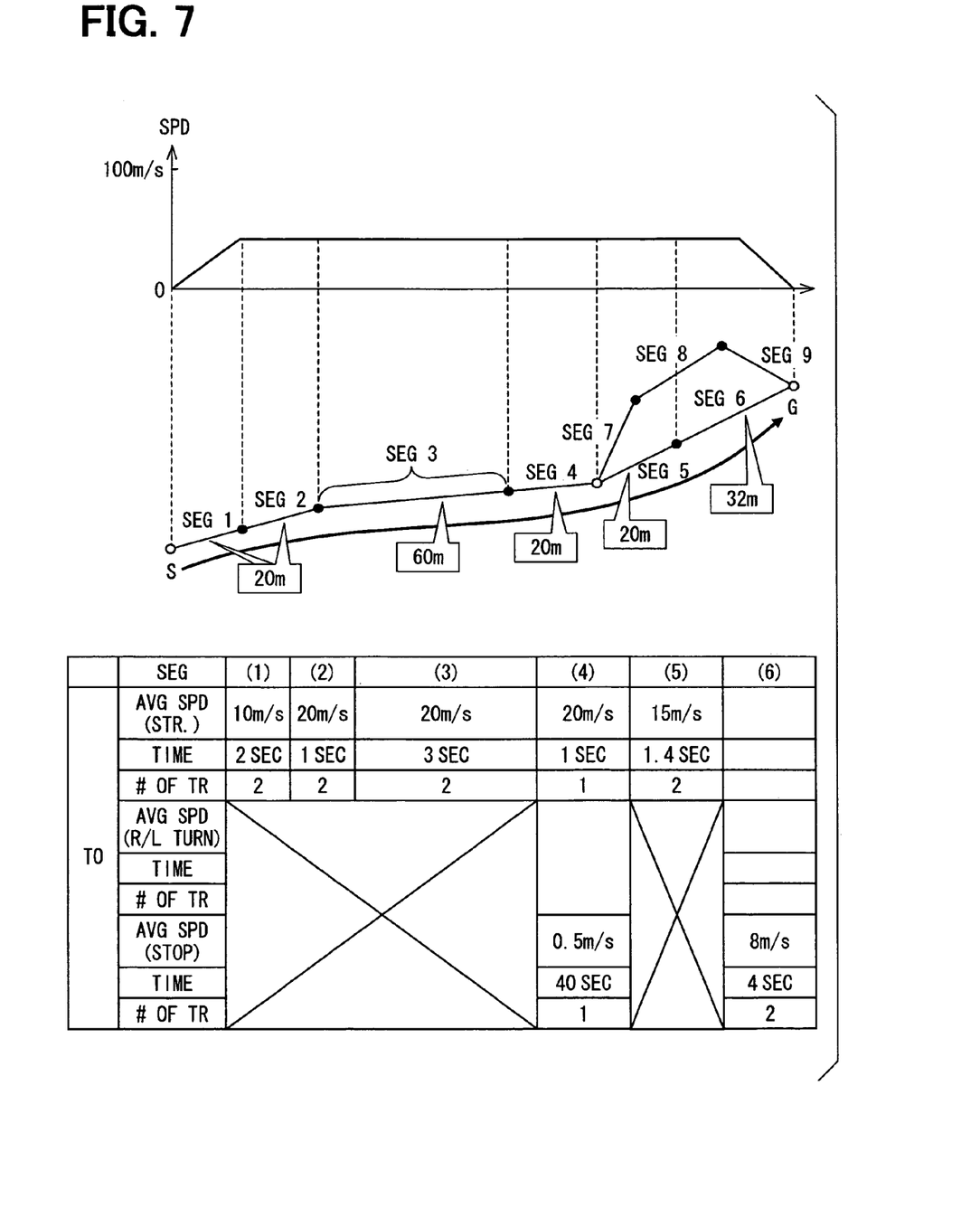
FIG. 7 shows another illustration of data storage to the database in the learning unit.
Figure 8:
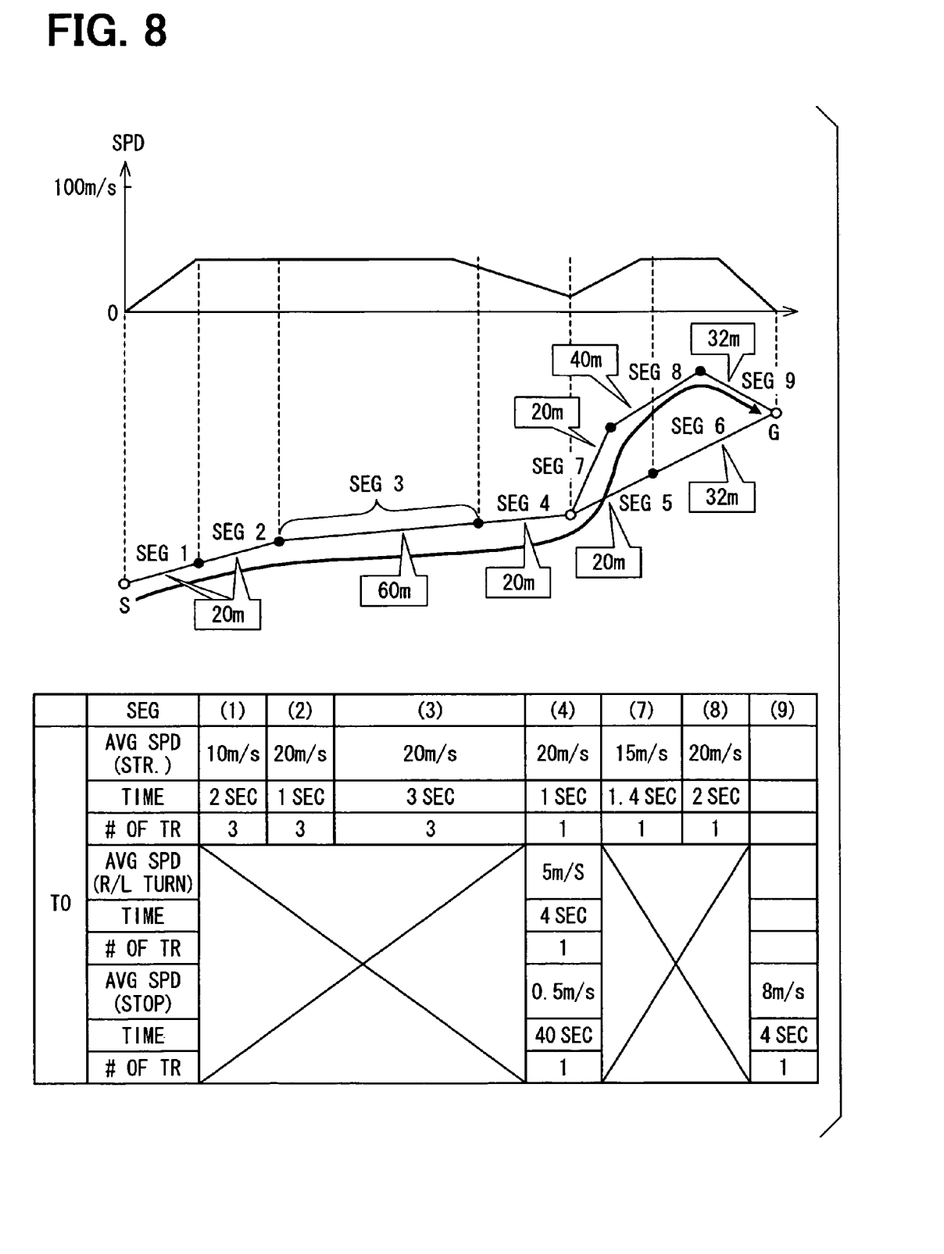
FIG. 8 shows yet another illustration of data storage to the database in the learning unit.

A concrete content of the processing performed by the control unit 20 is explained in the following. The outward trip of segments (1), (2) and so on is described with reference to FIGS. 4, 5 in the following example, and storage of data only of the outward trip to the database is described with reference to FIGS. 6 to 9. In the illustrations of FIGS. 6 to 8, segment lengths are shown in balloons.

(Summary of Processing)

Figure 2:
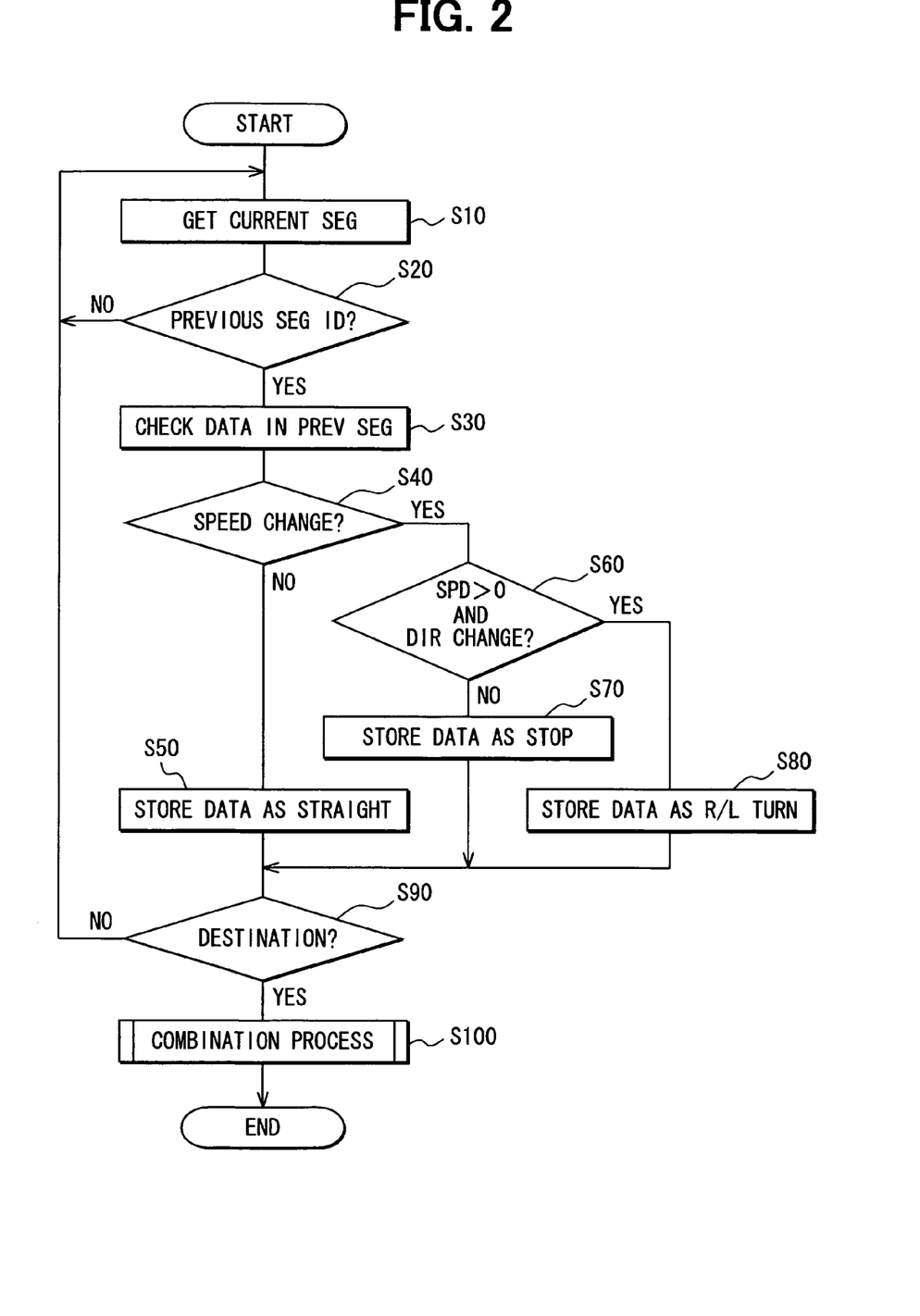
FIG. 2 shows a flowchart of control information storage/combination processing.

When the power supply is started to the navigation apparatus 10, the control unit 20 starts control information storage/combination processing as shown in the flowchart of FIG. 2.

When the control information storage/combination processing is started, at first a segment ID (a segment number) that is being traveled is acquired in S10. Then, in S20, whether a previous segment ID is existing is checked.

If there is the previous segment ID (S20: YES), the process proceeds to S30, and the vehicle speed data in the previous segment is checked. Then, in S40, whether there is a change of vehicle speed data in a connection part with the segment that is currently being traveled.

If there is no vehicle speed data change at the connection part with the current segment (S40: NO), the data is stored as the data of straight travel (S50). For example, the average speed data of straight travel by 10 m/s in an elapsed time of 2 seconds for a travel time of one travel occasion is stored as learning data value corresponding to the segment (1) as shown in FIG. 6.

On the other hand, if there is the change of vehicle speed data (S40: YES), whether a condition "vehicle speed >0" and a condition of direction change at the connection part with the current segment are fulfilled is checked (S60). If the above conditions are not fulfilled (S60: NO), the data is stored as the data of stopping (S70), and if the conditions are fulfilled (S60: YES), the data is stored as the data of the right/left turning (S80).

After storing the data in either of S50, S70, or S80, the process proceeds to S90, and whether the vehicle has reached the destination is checked. The process keeps returning to S10 until the vehicle reaches the destination (while S90 is NO), and when the vehicle reaches the destination (S90: YES), combination processing is performed (S100).

(Details of Vehicle Speed Data Storage by Segments)

Figure 9:
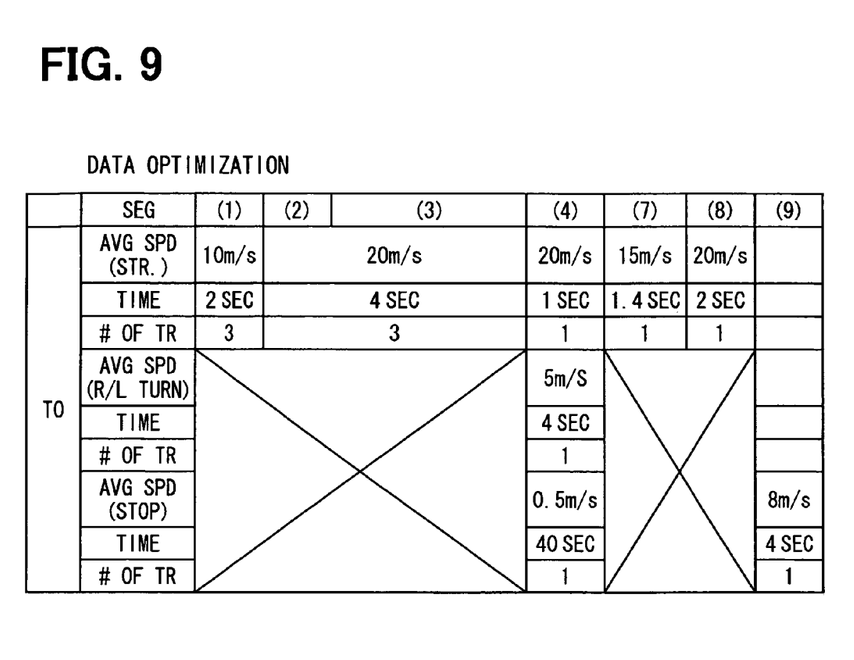
FIG. 9 shows a diagram of the database in the learning unit having data in a combined condition.
Figure 10:
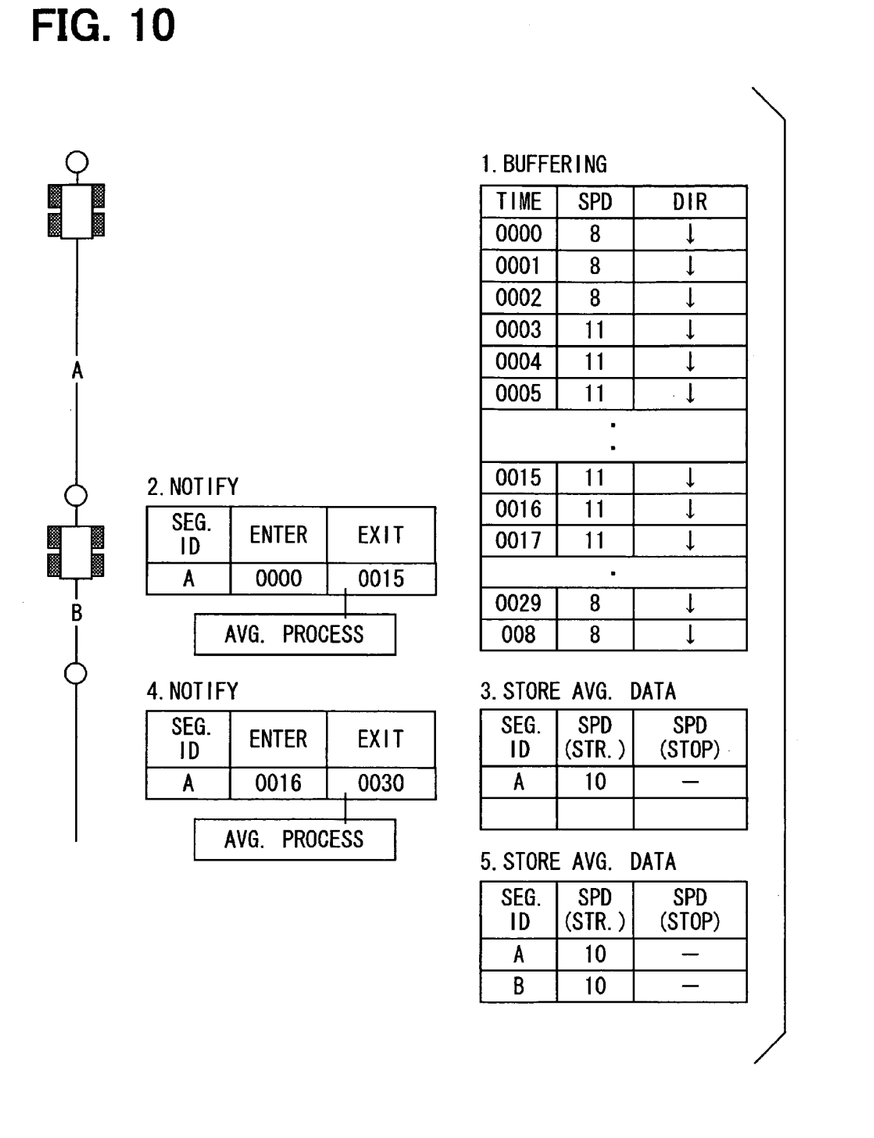
FIG. 10 shows an illustration of speed data generation scheme for each segment.
Figure 11:
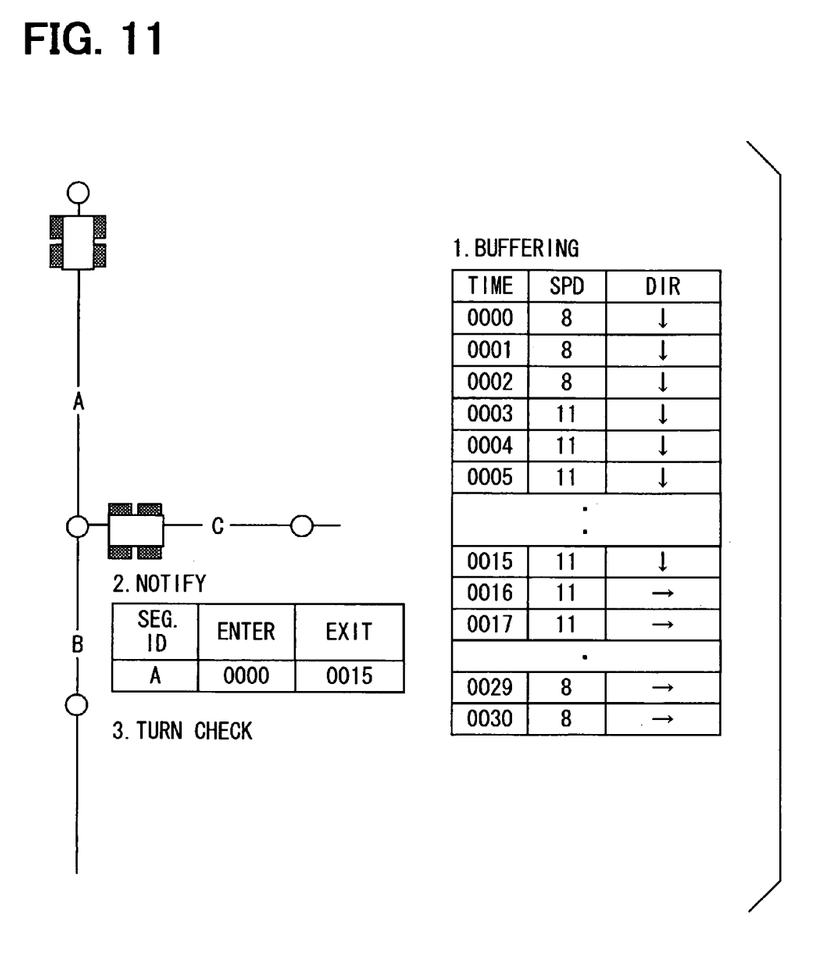
FIG. 11 shows another illustration of speed data generation scheme for each segment.

The generation of the vehicle speed data by the segments and storage of the data are described with reference to FIGS. 10, 11. In addition, FIGS. 10, 11 show a scheme of the vehicle speed data generation by the segments. A unit of the vehicle speed is same as the one in FIGS. 6 to 9 (i.e., [m/s]).

Though the vehicle speed data to be stored is the data by the segments, the learning unit 23 of the control unit 20 collects the vehicle speed data from the vehicle information sensor group 31 by a scheduled sampling period for buffering in the memory 23a (refer to FIG. 10).

The buffering is continued while the vehicle is traveling in a segment A, and the buffered data is notified from the vehicle position calculation unit 21 to the learning unit 23 at the timing when the segment A is traveled through. The learning unit 23 acquires the vehicle speed data between an entrance of the vehicle into the segment A (0000 in FIG. 10) and an exit from the segment A (0015 in FIG. 10) from the data buffered in the memory 23a for calculation of the average speed. Then, the vehicle speed data which is averaged for every segment ID is stored to the database 23b.

The buffering of data for the travel of a segment B is performed in the same manner, for a notification from the calculation unit 21 to the learning unit 23 at the timing when segment B is traveled through.

With learning unit 23, data to (the example of FIG. 10, 0030) are acquired from (the example of FIG. 10, 0016) than data buffered by memory department 23a (to the segment B) at the leaving time at the approach time, and average processes. The learning unit 23 acquires the vehicle speed data between an entrance of the vehicle into the segment B (0016 in FIG. 10) and an exit from the segment B (0030 in FIG. 10) from the data buffered in the memory 23a for calculation of the average speed. Then, the vehicle speed data which is averaged for every segment ID is stored to the database 23b.

On the other hand, the determination as shown in S60 of FIG. 2 is described with reference to FIG. 11. The illustration in FIG. 11 shows an example of a left turn from the segment A to segment C. The learning unit 23 of the control unit 20 collects the vehicle speed data from the vehicle information sensor group 31 by a scheduled sampling period, and the data is buffered in the memory 23a for a notification from the vehicle position calculation unit 21 to the learning unit 23 at the timing when the segment A is traveled through. The entrance time into the segment A is 0000 in the example of FIG. 11, and the exit time from the segment A is 0015 in the same example of FIG. 11. Then, a travel direction is checked for N seconds after the exit time from the segment A. Then, the change of the direction is determined whether it is greater than a threshold, and the travel is determined to be the right/left turn in a case that the direction change is greater than the threshold.

(An Example of Learning Data Value in a Database)

FIGS. 6 to 8 illustrate an example of learning data value stored to the database 23b for explanation.

FIG. 6 is an illustration of travel of a certain road for the first time. The vehicle travels in an order of segments (1)-(2)-(3)-(4)-(5)-(6). In this case, the travel of the vehicle starts at one end of the segment (1), and the vehicle stops at one time at the crossing where segments (4), (5), (7) connect with each other, and the vehicle stops at one end of the segment (6). The information about the segments (4), (6) is classified as the average vehicle speed of stopping, and the other information is classified as the average vehicle speed of straight travel. The number of travel times is 1 for each segments because the vehicle travels each segments for the first time.

FIG. 7 is an illustration of travel of the road for the second time. The vehicle travels the same road as shown in FIG. 6 in the same order, that is, segments (1)-(2)-(3)-(4)-(5)-(6). This time, the travel of the vehicle starts at one end of the segment (1), and the vehicle stops at one end of the segment (6), without stopping at the crossing where segments (4), (5), (7) connect with each other.

In this case, the information about the segment (4) is classified as the average vehicle speed of stopping, and the other information is classified as the average vehicle speed of straight travel. The information about the segments (1), (2), (3), (5) is classified as the average vehicle speed of straight travel in the same way as the case of FIG. 6, and the information about the segment (6) is classified as the average vehicle speed of stopping in the same way as the case of FIG. 6. Therefore, the number of travel times becomes two for these segments as shown in FIG. 7. Because the information is stored in the same area as the information for the first time, values of the average vehicle speed and the elapsed time are stored as the average of the first and second travel.

On the other hand, the information about the segment (4) is classified as the average vehicle speed of straight travel, because the vehicle travels without stopping for the second time. Naturally the number of travel times becomes one because this is the storage of the average vehicle speed of straight travel for the first time.

FIG. 8 shows an illustration of the travel for the third time. This time, the vehicle travels segments (1)-(2)-(3)-(4)-(7)-(8)-(9) in this order. The travel of the vehicle starts at one end of the segment (1), and the vehicle turns left at the crossing where segments (4), (5), (7) connect with each other, and the vehicle stops at one end of the segment (9).

In this case, the information about the segment (4) is classified as the average vehicle speed of right/left turning, and the information abut the segment (9) is classified as the average vehicle speed of stopping, and the other information is classified as the average vehicle speed of straight travel. Because the information about segments (1), (2), (3) is the average vehicle speed of straight travel as shown in FIGS. 6 and 7, the number of travel times is counted as three for those segments as shown in FIG. 8. The information about the segment (4) is classified as the average vehicle speed of right/left turning for the first time, thereby making the number of travel times as one in the data. The information about the segments (7), (8), (9) naturally marks the number of travel times as one, due to the first time travel of the vehicle in those segments.

(Details of Combination Processing)

Details of the combination processing in S100 of FIG. 2 is described with reference to the flowchart of FIG. 3 and data update example in the database in FIG. 9.

Figure 3:
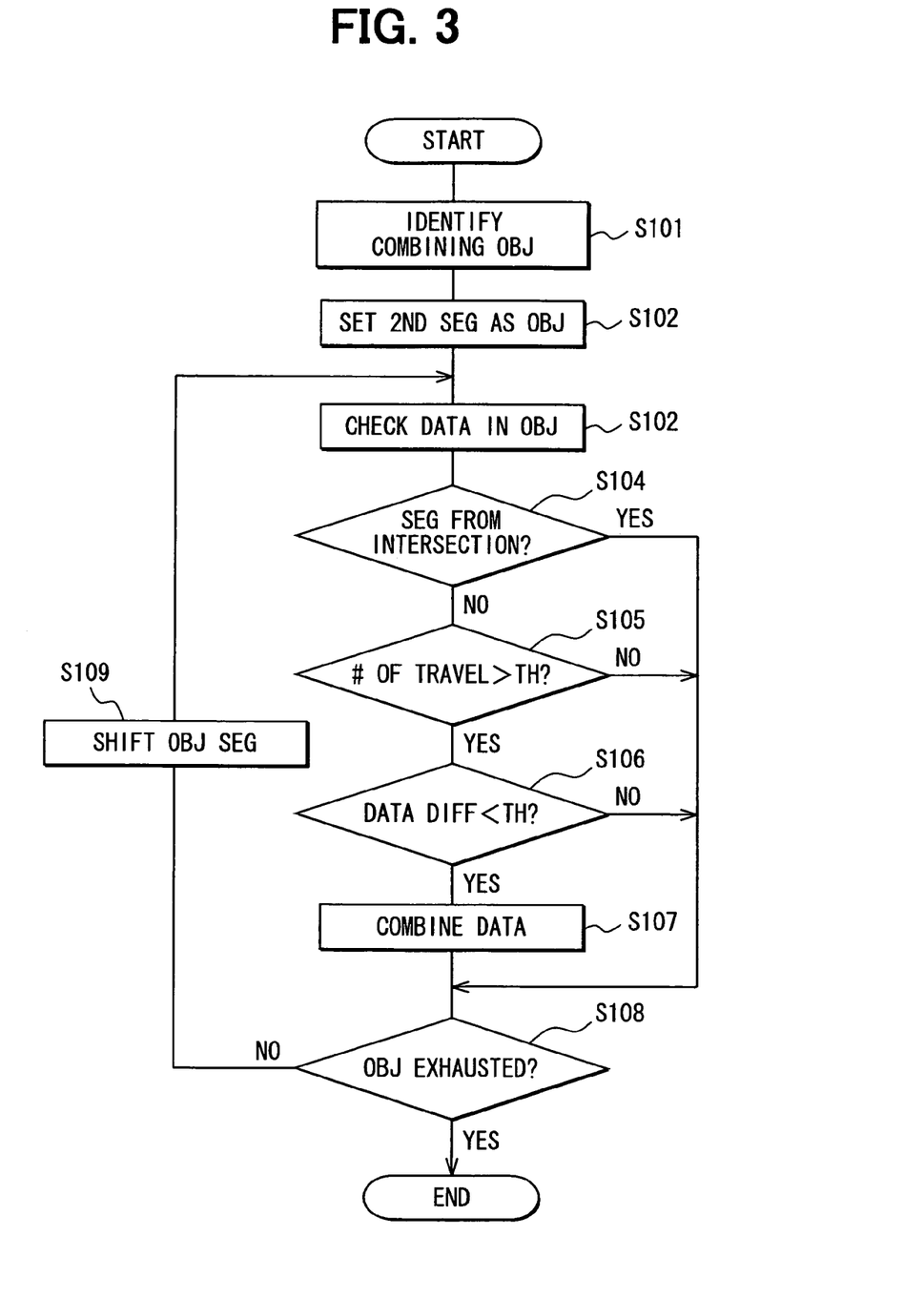
FIG. 3 shows a flowchart of combination processing.

When the combination processing in the flowchart of FIG. 3 is started, first an object of the combination processing is identified (S101). For example, the objects of the combination processing are the segments (1)-(9) as shown in FIGS. 6 to 8. And, for the second segment among the objects of combination (i.e., the segment (2) in an example of FIGS. 6-8), the learning data of the segment is checked (S102).

The reason why the combination processing starts from the second segment of the combining objects in S102 is that there is no previous object to be combined for the combination processing of the first segment. That is, if there is no previous object to be combined, the combination processing itself can not be performed.

At first, whether it is a segment connected to the crossing is determined (S104), and, the process proceeds to S108 if the segment is connected to the crossing (S104: YES) without going through S107. In other words, the learning data value for a segment connected to the crossing is not assumed to be the combination object.

The step S104 serves as a condition of determination from a geographical point of view. The learning data value for the segment that is connected to the crossing is excluded from a combination object. When the travel environment of the two segments is similar, the learning data values may be suitably combined. However, when the traveling position, that is, the segment, is connected to the crossing, the vehicle speed may possibly be changed in a great deal due to the traffic signal, a right/left turn of the leading vehicle and the like. The combination of the learning data value of the traveling position where the speed changes in a great deal with the learning data value of the position of such change may relatively deteriorate the reliability of the learning data value. Therefore, the learning data value of such segment is not connected to maintain the usefulness of the stored information.

On the other hand, if the segment is not connected to the crossing (S104: NO), the process proceeds to S105. In S105, the number of travel times is compared with a threshold. The threshold may be determined from a statistical point of view, for example, and the threshold is used to reserve reliability of the value when the learning data value is connected in S107. That is, for example, if it is assumed to be difficult for securing the reliability of the learning data value by performing the combination processing for the data of only two times of travel, the threshold may be set to two or greater, thereby allowing the combination of the learning data value for the travel of three times or more. The threshold value may be set to one if it appropriately secures the data reliability.

If the number of travel times is equal to or smaller than the threshold (S105: NO), the process proceeds to S108 without going through S107. In other words, the segment that has been traveled only for the number of times below the threshold is not considered as an object of learning data value combination. If the number of travel times is greater than the threshold (S105: YES), the process proceeds to S106.

In S106, the difference of the learning data value is examined whether it is smaller than a threshold. The threshold value is established from the following viewpoint. That is, the learning data value in the database 23b is used as the control information in the fuel mileage control unit 41 and the ACC control unit 42. Therefore, based on the accuracy that is required for the contents of the control, the threshold value is determined in accordance to criteria that the combination of the data values with the speed change below the threshold does not cause any problem in terms of suitability of the purpose of specific control. For example, the threshold may be set to 2 m/s, 3 m/s or the like.

If the difference of the learning data values is equal to or greater than the threshold (S106: NO), the process proceeds to S108 without going through S107. In other words, the learning data value is not considered as the combining object if the difference of the learning data values is not equal to or greater than the threshold. If the difference of the learning data values is smaller than the threshold (S106: YES), the process proceeds to S107, and the learning data values are combined. When the combination of the learning data values in S107 is finished, the process proceeds to S108.

In S108, whether the combination processing has handled the last object that is identified in S101 is determined. If the processing has not exhausted the identified objects (S108: NO), the process returns to S103 to handle the next object segment (S109). The combination processing is performed in the above-described manner for the learning data value of the second object segment and subsequent segments in order.

When the combination processing has handled the last combination object (S108: YES), the combination processing concludes itself. That is, the processing shown in FIG. 2 is finished. The details of the processing is described with reference to the illustration in FIG. 9.

When a database shown in FIG. 6 and a database shown in FIG. 7 are respectively created, the affirmative determination is performed in S90 of FIG. 2, and the combination processing of S100 is carried out. However, if the threshold in S105 takes the value of two, the above databases are not considered as the object of the combination processing while the number of travel times is two or smaller. In addition, because the learning data value for the segment connected to the crossing is not basically the combination object based on the determination in S104 in the first place, the learning data value for any segment is not combined after creation of the databases shown in FIGS. 6 and 7.

In contrast, when a database shown in FIG. 8 is created, the learning data and the value for the segment (2) is examined. The data value for the segment (2) is not of a crossing connecting segment (S104: NO), and the travel time for the segment (2) (=3) is greater than the threshold (=2) (S105: YES). However, the learning data are respectively 10 m/s and 20 m/s, thereby leading to the negative determination in S106 because the threshold is 3 m/s. Therefore, the combination processing of S107 is not carried out.

Then, the learning data and the value for the segment (3) is examined. The learning data of the segment (3) is not the crossing connecting segment (S104: NO), and the number of travel times is greater than the threshold (=2) (S105: YES). Further, the learning data indicating 20 m/s (same as the previous segment) leads to the affirmative determination. Therefore, the combination processing of S107 is carried out. The learning data values for the segment (4) and subsequent segments are not combined in consequence. As a result, a database that stores a single set of the learning data values in common for both of the segments (2) and (3) is finally created.

(Details of the Control by the Control Information)

An example of situation under control of the control information is described in the following. That is, when a guidance course is set in the navigation apparatus 10, the safety control processing unit 24 outputs the average vehicle speed (i.e., control information) corresponding to a segment constituting the guidance course concerned from the database 23b of the learning unit 23 to the vehicle control units 41, 42.

For example, the fuel mileage control unit 41 controls the engine and the driving force from the vehicle drive motor based on the average vehicle speed of each segment for a purpose of effective charging and discharging. The hybrid vehicle typically generate driving force from a rotation of the motor by using the electricity accumulated in an electricity accumulation unit, and, on the other hand, regenerated energy is converted into electricity to be stored in the electricity accumulation unit at a time of going down a slope, a speed reduction or the like.

The engine rotation energy and the regenerated energy are greatly influenced by the travel condition of the vehicle. Therefore, the timing of storing the electricity to the electricity accumulation unit and/or the amount of the accumulated electricity are influenced greatly by the travel condition of the vehicle. Thus, it is very important and efficient to accumulate the electricity in the electricity accumulation unit according to the travel condition. In other words, the average vehicle speed is utilized for planning a charging/discharging scheme in a practical manner, thereby leading to an energy-efficient travel of the vehicle.

Further, the ACC control unit 42 performs a constant speed travel control based on received average vehicle speed (when there is no leading vehicle). For example, the speed control to reduce the vehicle speed to an appropriate level is performed when the vehicle turns to the left.

The above-described control of vehicle speed reduces the burden of the driver who otherwise has to apply the brake for his/her own judgment. The above description only mentions the vehicle speed in terms of information input from the sensor group 31. However, the other information such as the shift change, accelerator opening, engine rotation, brake signal, fuel injection amount may also be utilized as the control information when a specific purpose of vehicle control requires such information.

For example, the fuel mileage control unit 41 can utilize the fuel injection amount besides the vehicle speed as the control information. On the other hand, the ACC control unit 42 can utilize information about the shift change, accelerator opening, engine rotation, brake signal the as control information besides the vehicle speed.

(Advantageous Effects of the Embodiment)

(1) The vehicle speed is stored in the database 23b by a unit of segment, and the data for the segment that is traveled for plural times is averaged before storage. Further, the data is stored in combination when data values for two adjacent segments fulfill a set of predetermined conditions (e.g., S104: NO, S105: YES in FIG. 3 in combination with S106: YES) for reduction of data storage area. That is, S104, S105 in FIG. 3 serves as the prerequisite of the data combination processing. The prerequisite is established for the purpose of avoiding a false data combination that does not lead to the reduction of data storage area.

(2) Further, the reduction of data area contributes to the reduction of the amount of the control information, thereby resulting in a reduced processing load in the vehicle control units 41, 42 or the like.

(3) The learning data value in the database 23b is categorized as either of the straight travel, right/left turn, or stopping when the vehicle is departing from one segment to go into another. Further, the averaging of the vehicle speed and the combination of data value are performed within the boundary of those categories.

The above categorization of the learning data value provides the usefulness of the stored data for the accuracy and effectiveness of the control of the vehicle according to the actual travel environment.

(Correspondence with Claims)

The navigation apparatus 10 in the present embodiment includes the GPS sensor 11, the direction sensor 12, the distance sensor 13, the map database 14 and the vehicle position calculation unit 21 in the control unit 20. The above components in the navigation apparatus 10 may conceptually be claimed as a travel position determination unit.

Further, the database 23b in the learning unit 23 may be conceptually be claimed as an information storage unit.

Furthermore, the safety control processing unit 24 may be conceptually be claimed as an information output unit.

Furthermore, the fuel mileage control unit 41 and the ACC control unit 42 may be conceptually be claimed as a vehicle control unit.

Furthermore, the segment may be conceptually be claimed as a road section.

(Other Embodiments)

Although the present invention has been fully described in connection with the preferred embodiment thereof with reference to the accompanying drawings, it is to be noted that various changes and modifications will become apparent to those skilled in the art.

For example, (1) In the above embodiment, the vehicle speed as the control information is memorized by a unit of segment. However, the vehicle speed may be memorized by a unit of link.

(2) In the above embodiment, the present invention is shown as an application to a hybrid vehicle that is powered by a gasoline engine and a motor. However, the present invention may be applicable to gasoline engine vehicle, or to an electricity-powered vehicle, or to other type of vehicles.

(3) In the above embodiment, the present invention is shown as a navigation apparatus with the control information storage apparatus installed therein. However, the present invention may be constituted as an apparatus that is separately organized from the navigation apparatus.

Such changes and modifications are to be understood as being within the scope of the present invention as defined by the appended claims.

What is claimed is:

1. A control information storage apparatus comprising:
   a travel position determination unit capable of determining a travel position of a vehicle with regard to a predetermined road section;
   an information storage unit; and
   a storage control unit capable of storing control information that is derived from a travel of the vehicle for use in vehicle travel control, wherein
   the storage control unit stores to the information storage unit the control information in association with the road section that is identified by the travel position determination unit,
   the storage control unit stores the control information derived from plural travel occasions of a same road section as an averaged value of the plural travel occasions,
   the storage control unit stores only one entry of the control information for two adjacent road sections by combining two entries of the control information respectively in association with the two adjacent road sections if the two entries of the control information are determined to be substantially identical based on a predetermined criterion of sameness,
   the storage control unit determines whether the vehicle has performed one of a straight travel, a right/left turn and a stopping at a road section based on a speed and a travel direction,
   the storage control unit categorizes the control information into one of the straight travel, the right/left turn and the stopping for storage to the information storage unit based on a determination result, and
   the storage control unit performs processing of the control information within respective categories of the straight travel, the right/left turn and the stopping if the processing of the control information involves at least one of storage of the averaged value and combination of the control information.

2. The control information storage apparatus of claim 1, wherein
   the storage control unit excludes the control information from an object of entry combination if the control information is in association with a road section that is connected to an intersection.

3. The control information storage apparatus of claim 1, wherein
   the storage control unit excludes the control information from an object of entry combination if the control information is in association with a road section that is traveled by a number that is equal to or smaller than a predetermined count.

4. The control information storage apparatus of claim 1 further comprising:
   an information output unit capable of outputting toward a vehicle control unit the control information that is stored in the information storage unit.

5. The control information storage apparatus of claim 1, wherein
   the control information includes at least information of vehicle speed.

6. A program product stored in an information storage medium for controlling a computer to be serving as the storage control unit of the control information storage apparatus of claim 1.

* * * * *